Sept. 22, 1970 — E. T. GETZ — 3,529,866
SUPPORT STRUCTURE
Filed Nov. 12, 1968 — 5 Sheets-Sheet 2
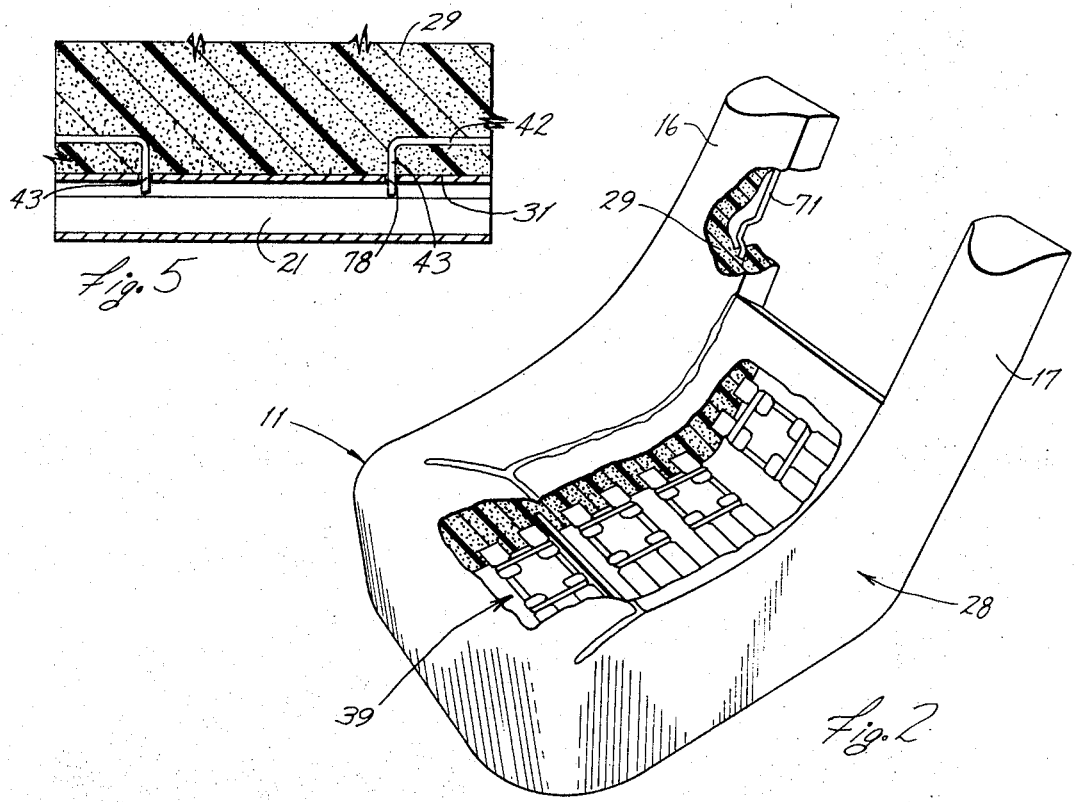
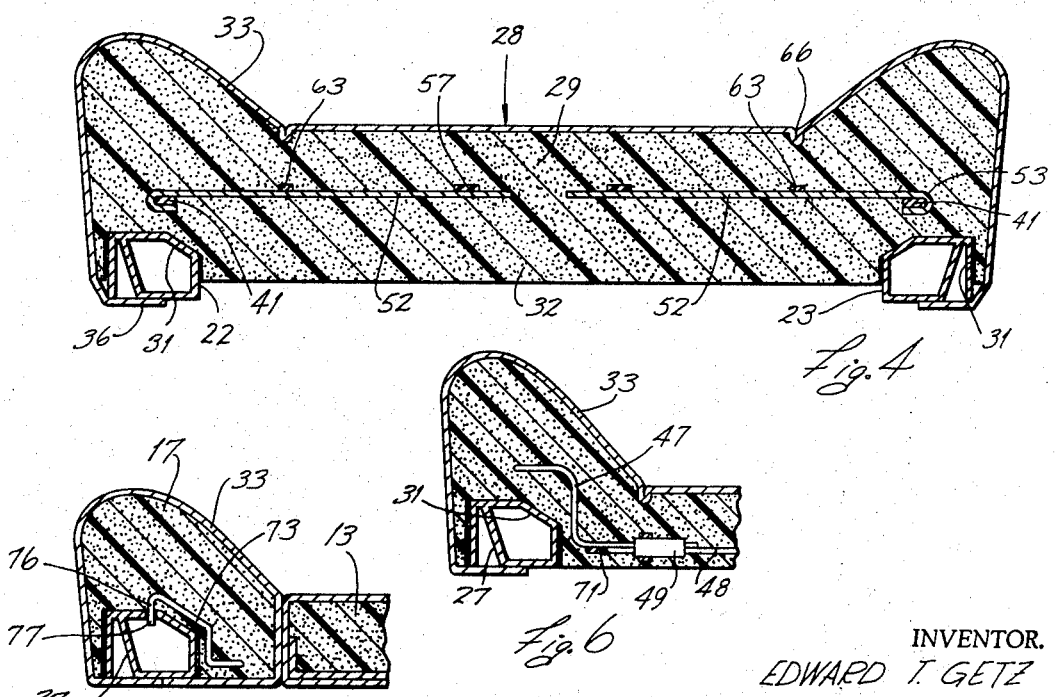
INVENTOR.
EDWARD T. GETZ
BY Woodhams, Blanchard & Flynn
ATTORNEYS

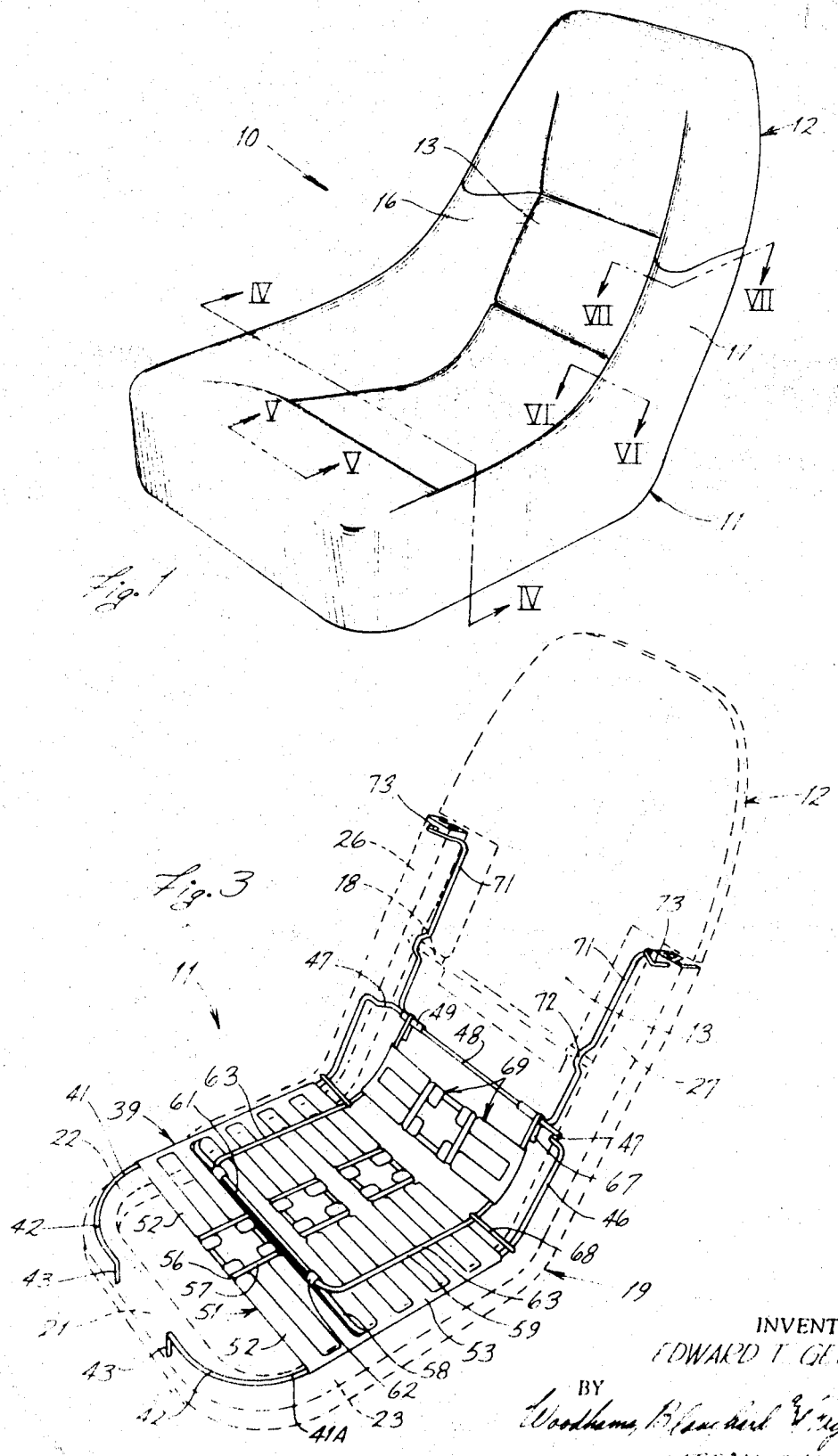

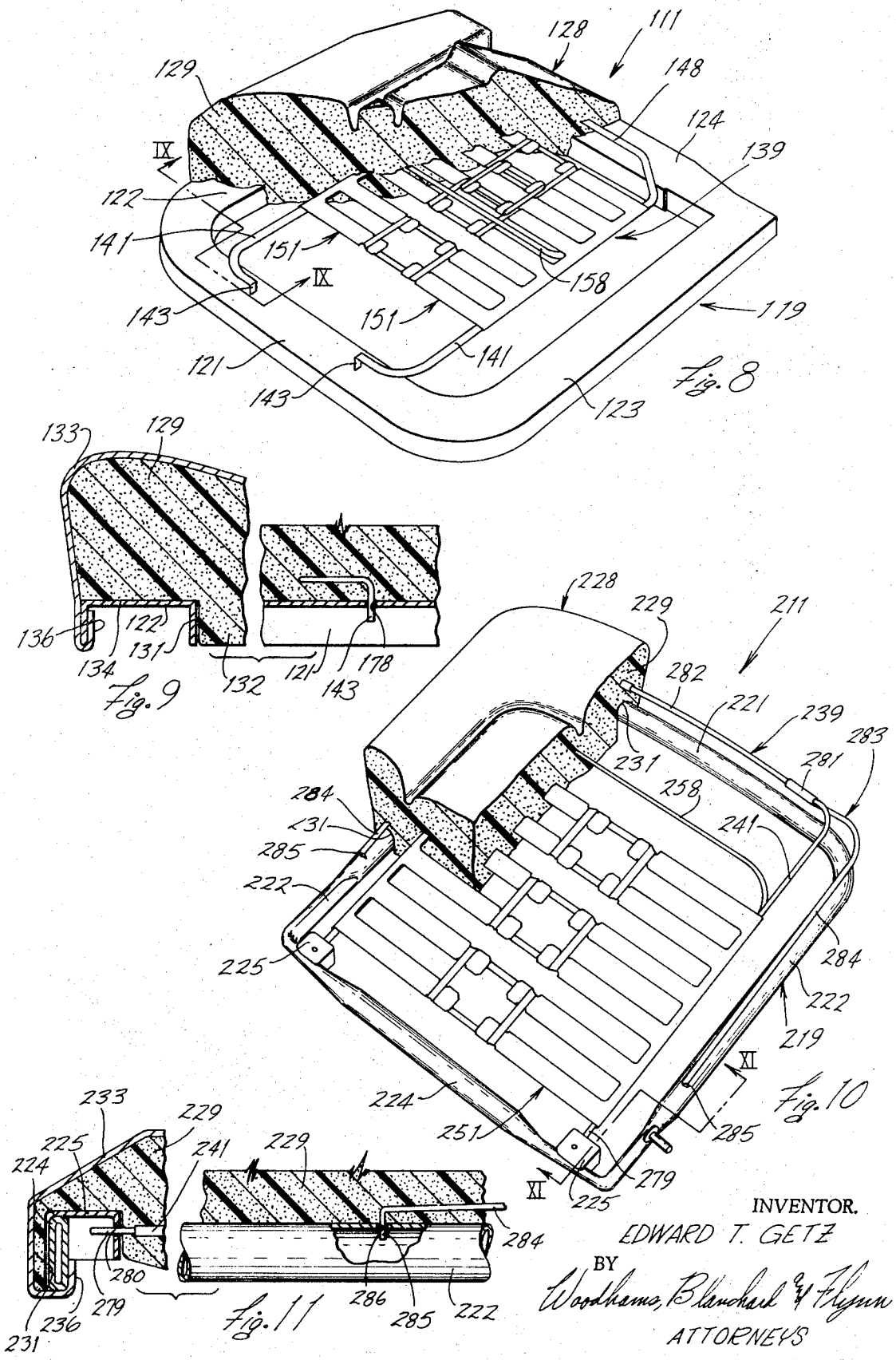

Sept. 22, 1970  E. T. GETZ  3,529,866
SUPPORT STRUCTURE

Filed Nov. 12, 1968  5 Sheets-Sheet 4

INVENTOR.
EDWARD T. GETZ
BY
Woodhams, Blanchard & Flynn
ATTORNEYS

Sept. 22, 1970  E. T. GETZ  3,529,866
SUPPORT STRUCTURE

Filed Nov. 12, 1968  5 Sheets-Sheet 5

INVENTOR.
EDWARD T. GETZ
BY
Woodhams, Blanchard & Flynn
ATTORNEYS

United States Patent Office 3,529,866
Patented Sept. 22, 1970

3,529,866
SUPPORT STRUCTURE
Edward T. Getz, Cleveland Heights, Ohio, assignor to Eaton Yale & Towne Inc., Cleveland, Ohio, a corporation of Ohio
Filed Nov. 12, 1968, Ser. No. 774,839
Int. Cl. A47c 27/14, 27/22
U.S. Cl. 297—452      21 Claims

ABSTRACT OF THE DISCLOSURE

A cushion structure particularly suitable for use as a vehicle seat and adapted to be mounted on an independent main frame. The cushion structure includes an internal support assembly embedded within a layer of resilient material. The internal support assembly includes load transfer means which extend toward the center portion of the cushion, which portion is subjected to the greatest loads. The cushion structure is further provided with locating means fixedly secured thereto for permitting the cushion structure to be properly positioned on the main frame. An upholstery cover at least partially surrounds the cushion structure and the main frame to connect same together.

FIELD OF THE INVENTION

This invention relates to a load supporting structure and, in particular, to a load supporting structure particularly adaptable for use as a vehicle seat, the load supporting structure including an internal support assembly embedded with a layer of resilient material to form a cushion structure which can be easily positioned on and connected to the rails of a conventional vehicle seat frame.

BACKGROUND OF THE INVENTION

Most prior known vehicle seat structures have utilized a plurality of zig-zag springs interconnected between the opposite side rails of a substantially rectangular frame, the adjacent zig-zag springs in turn being interconnected by various means, such as clips or tension springs. The zig-zag springs are generally covered with jute packing and a plurality of resilient pads are then generally positioned on the jute packing to form the desired seat structure. The uppermost pad is often of a resilient foam material and has a contour corresponding to the desired contour of the seat structure. Due to the large number of elements and pieces involved, it is necessary to tie the various pads to a frame and to the springs, same generally being done manually. A suitable upholstery cover is then used to surround the completed cushion structure.

Vehicle seats constructed as described above are relatively costly to manufacture and accordingly represent an undesirable proportion of the cost of a vehicle. Specifically, these prior known vehicle seats, wherein a large number of individual components are utilized, result in a complex and time-consuming assembly procedure which is expensive and inefficient since it requires a substantial amount of manual labor to assemble the related components of the seat assembly.

Accordingly, it is an object of this invention:

(1) To provide a load support structure utilizing internal support means embedded within an elastomeric material to form a cushion structure which can be easily positioned on a conventional support frame.

(2) To provide a load support structure, as aforesaid, particularly suitable for use as a vehicle seat.

(3) To provide a load support structure, as aforesaid, wherein the cushion structure has index finger means which extend from the elastomeric material and are receivable in apertures formed in the support frame for permitting the cushion to be easily positioned on the frame.

(4) To provide a load support structure, as aforesaid, wherein the cushion structure is easily positioned on the support frame by means of a nesting relationship therebetween.

(5) To provide a load support structure, as aforesaid, wherein the internal support means includes a pair of spaced side support members each having a flexible load transfer member mounted thereon, and wherein the load transfer member comprises a plurality of elongated finger-like members which extend outwardly into the region of heavy load.

(6) To provide a load support structure, as aforesaid, wherein the side support members are positioned directly above or closely adjacent the side rails of the support frame when the cushion structure is assembled thereto for permitting the applied loads to be transferred to the frame.

(7) To provide a load support structure, as aforesaid, wherein the cushion structure is interconnected to the support frame by means of the index finger means and/or by means of a suitable covering, such as of upholstery material.

(8) To provide a load support structure, as aforesaid, which is suitable for use as either a base portion or a back portion of a vehicle seat, same also being adapted to have a rest formed thereon when utilized as the back portion of the vehicle seat.

(9) A load support structure, as aforesaid, wherein the complete internal support means, except for the index finger means, is embedded and encased within the elastomeric material to form a cushion structure which is easily and efficiently manufactured and which is easily positionable on and connectable to a conventional vehicle seat frame.

Other objects and purposes of this invention will be apparent to persons acquainted with apparatus of this general type upon reading the following specification and inspecting the accompanying drawings.

BRIEF DESCRIPTION OF THE DRAWINGS

FIG. 1 is a perspective view of a bucket-type seat for use in vehicles, same being illustrative of one possible application of the cushion structure of this invention.

FIG. 2 is a perspective view of the base portion of the seat illustrated in FIG. 1, with part broken away to illustrate the internal construction of the seat.

FIG. 3 is a perspective view of the internal support assembly for the base portion of the seat, the back portion of the seat and the frame for supporting the base portion of the seat shown in dotted lines.

FIG. 4 is an elevational cross-sectional view of the base portion of the seat taken substantially along the line IV—IV of FIG. 1.

FIG. 5 is a partial sectional view taken substantially along the line V—V of FIG. 1 and illustrating the manner in which the cushion structure is indexed or positioned on the frame.

FIG. 6 is a partial sectional view taken substantially along the line VI—VI of FIG. 1 and showing a further detail of the internal support assembly.

FIG. 7 is a partial sectional view taken substantially along the line VII—VII of FIG. 1 and showing still a further constructional detail of the internal support assembly and its relationship to the support frame.

FIG. 8 is a broken perspective view of a modified base portion for a vehicle seat.

FIG. 9 is a broken sectional view taken substantially along the line IX—IX of FIG. 8.

FIG. 10 is a broken perspective view of a further base portion having a cushion structure constructed in accordance with the present invention.

FIG. 11 is a broken sectional view taken substantially along the line XI—XI of FIG. 10.

SUMMARY OF THE INVENTION

Figure 12:
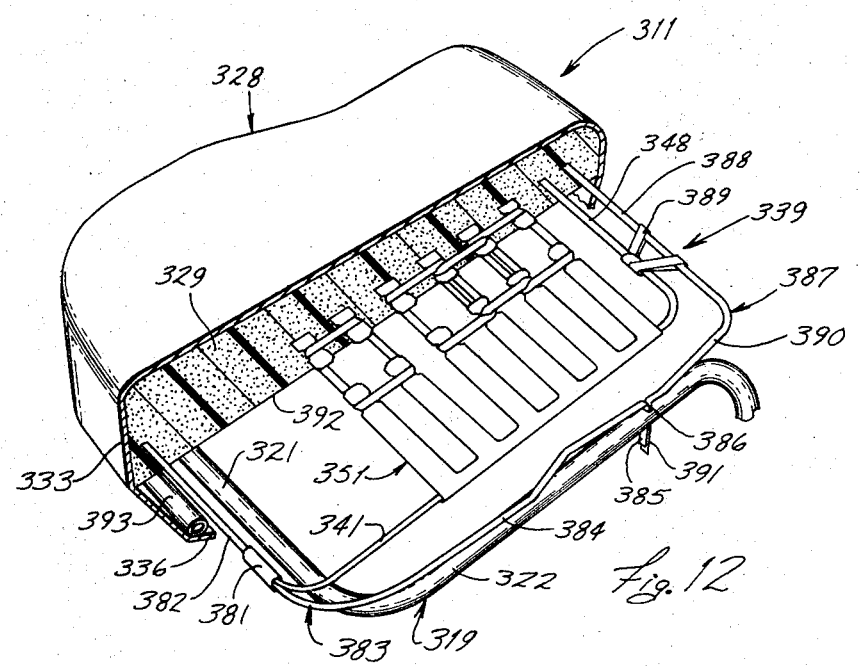
FIG. 12 is a broken perspective view of still another modification of a base portion for a vehicle seat.

In general, the objects and purposes of the invention are met by providing a load support structure, particularly a vehicle seat, wherein an internal support assembly is surrounded by and embedded in a resilient material to form a cushion-like structure. The cushion-like structure possesses means for locating and positioning same on a main frame which is independent of and separable from the cushion structure.

Specifically, the support assembly preferably includes a pair of spaced side support members each having a load transfer member thereon. The load transfer members are flexible and each include a plurality of finger-like elements which extend in a cantilever manner toward the central portion of the cushion structure. Upholstery tie-down wires are also generally provided and are connected to the side support members. The complete support assembly is surrounded and embebded within a layer of elastomeric foam material. The elastomeric structure may be formed with an exterior contour corresponding to the desired shape of the finished cushion. The internal support assembly is further provided with at least one pair of fingers or tabs which are connected to the side support members and extend outwardly through the external periphery of the elastomeric material. The outwardly extending tabs are receivable in apertures formed in a separate main frame for permitting the cushion structure to be easily but accurately positioned on the main frame. Further, the cushion is preferably positioned on the main frame in nested relationship therewith. A suitable cover of upholstery material at least partially surrounds the cushion structure and the main frame to connect same together to form the completed vehicle seat.

DETAILED DESCRIPTION

Referring to the drawings, FIG. 1 illustrates one embodiment of a load-supporting seat structure, particularly a bucket-type seat for use in vehicles and reference will be made hereinafter for illustrative purposes to such a seat. It will be obvious, however, that the invention is applicable to other vehicle seat constructions and to seat constructions for furniture.

The seat construction 10 shown in FIG. 1 comprises a base portion 11 and a back portion 12 for supporting a vehicle passenger. The back portion 12 is generally T-shaped and has a center portion 13 which extends downwardly and is positioned between a pair of upward extensions 16 and 17 formed on the base portion 11. As illustrated by broken lines in FIG. 3, the center portion 13 is conected to the upward extensions 16 and 17 by a pivot pin 18 extending therebetween for permitting back portion 12 to be pivotally moved (counterclockwise in FIG. 3) into a folded position.

The base portion 11 is provided with a conventional rigid main frame 19 (illustrated in dotted lines in FIG. 3) adapted to be mounted on the floor of the vehicle in a conventional manner to permit the position of the seat to be adjusted. The main frame 19 is substantially U-shaped and has a front rail 21 connected between a pair of parallel side rails 22 and 23. The rearward ends 26 and 27 of the side rails 22 and 23, respectively, extend upwardly to provide a support for the extensions 16 and 17.

The base portion 11 further includes a resilient cushion structure 28 (FIG. 2) adapted to be positioned on and supported by the main frame 19. The bottom (FIG. 4) and rearward (FIG. 6) surfaces of the cushion structure 28 have formed therein a substantially U-shaped recess 31 adapted to receive therein the U-shaped main frame 19 when the cushion structure 28 is positioned thereon. The recess 31 results in the cushion 28 having a downwardly extending central portion 32 positionable between the side rails 22 and 23 (FIG. 4) to nest the cushion 28 into the main frame 19.

As illustrated in FIG. 4, the cushion structure 28 is surrounded by a conventional cover means 33, preferably of upholstery material. The cover 33 extends downwardly and at least partially wraps around the rails of the frame 19 to connect and hold the cushion structure 28 in position on the main frame 19, thereby forming the completed seat structure. The edge portions 36 of the cover 33 can be secured to the frame rails in any conventional manner, such as by an adhesive or mechanical fasteners.

Considering now the details of the cushion structure 28, same is provided with an internal support assembly 39 which, as illustrated in FIG. 3, includes a pair of substantially parallel side support members 41 adapted to be positioned closely adjacent the side rails 22 and 23 when the cushion structure 28 is positioned on the main frame 19. In the embodiment of the invention illustrated in FIGS. 1–7, the side support members 41 are positioned directly above (FIG. 4) the side rails 22 and 23 to permit the loads imposed on the cushion structure to be transferred directly to the side rails.

The side support members 41 (FIG. 3) are each provided with a substantially straight and horizontal central portion 41A and a curved front portion 42, said latter being positioned above the front rail 21. The curved front portions 42 are each provided with a downwardly extending finger or index tab 43 thereon for a purpose to be explained hereinafter. The rearward portions 46 of the support members 41 extend upwardly at an angle relative to the central portion 41A and are positioned closely adjacent, but spaced from, the upwardly extending frame portions 26 and 27. The extreme rearward end of the support members 41 are provided with Z-shaped ends 47 thereon which extend inwardly and downwardly past the frame portions 26 and 27 as illustrated in FIG. 6. The adjacent Z-shaped ends 47 are connected to a cross member 48 by means of clips 49. The Z-shaped ends 47, in conjunction with the cross member 48, thus substantially function as a cradle which is positioned within and extends between the frame portions 26 and 27 to assist in properly positioning the cushion structure 28 on the main frame 19.

To provide the cushion structure 28 with the necessary strength and durability, each of the side support members 41 is provided with a flexible load transfer member 51 secured thereto. The flexible load transfer members 51 are substantially flat and have a plurality of elongated finger-like elements 52 which extend in a cantilever manner toward the portion of the cushion subjected to the greatest load. In the illustrated embodiment, the center part of the cushion is generally subjected to the greatest load and thus the fingers 52 of the two load transfer members 51 extend inwardly toward one another and toward the central portion of the cushion. The fingers 52 are connected to a substantially U-shaped base portion 53 which is hooked around the respective side support member 41 for attaching the load transfer member 51 thereto.

As illustrated in FIG. 3, the free ends of fingers 52 of the opposed load transfer members 51 are preferably positioned in a nonoverlapping relationship. Further, if desired, the fingers 52 can be provided with recesses or notches 56 adjacent the free ends for receiving therein a suitable flexible connecting element, such as a rubber ring 57. The rubber ring 57 aligns the adjacent ends of the opposing finger-like members 52 in the central area.

The cushion structure 28 is provided with a first upholstery tie wire 58 (FIG. 3) which extends between the side support members 41. The opposite ends of the tie wire 58 are connected to the support members 41 by any suitable means, such as by clips (not shown). A further U-shaped upholstery tie wire 59 is provided and has a base portion 61 which is positioned adjacent upholstery tie wire 58 and is connected thereto by means of suitable clips 62. The U-shaped upholstery tie wire 59 is further provided with substantially parallel and rearwardly extending side portions 63 which are positioned adjacent to and above the flexible fingers 52. The side portions 63 are substantially parallel to but spaced inwardly from the side support members 41, being positioned directly below the seam 66 formed within the cover 33 as illustrated in FIG. 4. The rearward ends of the side portions 63 extend upwardly and are provided with hooks 67 which engage the cross member 48. The side portions 63 are also connected to the adjacent side support members 41 by intermediate tie wires 68, which tie wires are positioned substantially at the bend formed in the members 41 and 63.

The rearward portions of the side members 63 are further provided with auxiliary load transfer members 69 thereon. The auxiliary load transfer members 69 are substantially identical to the load transfer members 51 described above except that the fingers of the auxiliary members 69 are of shorter length.

The internal support assembly 39, as illustrated in FIG. 3, is further provided with a pair of auxiliary side support members 71 which extend upwardly into the extensions 16 and 17. The auxiliary side support members 71 are connected at their lower ends to the cross member 48 by means of the clips 49. If desired, the auxiliary support members 71 and the cross member 48 can be constructed as an integral U-shaped member or, alternatively, the cross member 48 can be constructed integrally with the parallel side support members 41, in which case the auxiliary support members 71 would be individually connected thereto by means of suitable clips 49. Each of the auxiliary support members 71 are provided with an offset 72 therein intermediate its length to accommodate the pivot pin 18. The upper ends of the auxiliary support members 71 are each provided with a hook portion 73 for permitting the cushion structure 28 to be connected to the main frame 19.

As illustrated in FIG. 7, each of the hook portions 73 is provided with a tab or finger 76 on the free end thereof, which tab 76 is adapted to extend into a suitable aperture 77 formed in the adjacent portion of the main frame 19 (rail portion 27 as illustrated in FIG. 7). In a similar manner, the downwardly extending tabs 43, as illustrated in FIG. 5, are also adapted to extend into suitable apertures 78 formed in the front rail 21.

The cushion structure 28 is completed by embedding, as by molding, the internal support assembly 39 in its entirety within a layer of resilient material 29, which material is shaped during molding to have the desired seat configuration. The internal support assembly 39, except for the tabs 43 and 76, is completely embedded in and surrounded by the resilient material 29, thereby providing a layer of resilient material both above and below the fingers 52. The resilient material 29 is preferably a foam rubber, such as a polyurethane foam or a similar elastomeric or rubber-like foam material, and is preferably embedded in and bonded or secured to at least a portion of the load transfer fingers 52. Thus, advantage is taken of the cooperation between the fingers and the resilient material since any load applied to the cushion substantially normal to the surface thereof is transferred laterally throughout the material so that the load is proportionally taken by both the resilient material itself and by the flexible fingers.

Further, the nonoverlapping arrangement of the fingers 52 permits a desirable degree of flexibility and softness in the central or main bearing area of the cushion structure due to the ability of the fingers 52 to pivotally move downwardly about the side support members 41 upon loading of the cushion. Further, the side support members 41 are themselves floatably mounted above or adjacent the side rails 22 and 23 by means of an intermediate layer of resilient material. Thus, the side support members 41 can move downwardly or "give" when a load is applied to the structure. This "floating" action of the side support members 41 and attached load transfer members 51 provides an extraordinary feel of good cushioning for this type of load supporting structure.

MANUFACTURE AND ASSEMBLY

To manufacture the cushion structure 28, the internal support assembly 39 is first positioned within the cavity of a mold having the desired cushion configuration. The internal support assembly 39 is preferably suspended or supported within the mold cavity by means of the tabs 43 (FIG. 3) and 76 (FIG. 7). The mold cavity is then filled with moldable resilient material 29, thereby forming the completed cushion structure 28. When the cushion structure 28 is removed from the mold, all of the internal support assembly 39 is embedded within the foam material 29 except for the tabs 43 which extend outwardly from the lower surface of the cushion structure and the tabs 76 which extend outwardly from the rearward surface of the upward extensions 16 and 17.

To assembled the cushion structure 28 to the main frame 19, the cushion structure 28 is positioned such that the rails 21, 22 and 23 are received into the U-shaped recess 31 which extends around the bottom and rear surfaces of the cushion structure adjacent the side and front edges thereof, whereby the central projecting portion 32 of the cushion is positioned between said side rails. The recess 31, in conjunction with the central portion 32, thus substantially functions as an indexing means for permitting the cushion structure 28 to be quickly and properly positioned on the main frame 19.

Further, when the cushion structure 28 is positioned on the main frame 19, the tabs 43 extend into the apertures 78 formed in the front rail 21 and the tabs 76 extend into the apertures 77 formed in the frame portions 26 and 27. The tabs 43 and 76 thus further function as indexing means for assisting in properly positioning the cushion structure 28 on the main frame 19. If desired, the free ends of the tabs 43 and 76 can be bent over to positively hold the cushion structure in place on the frame 19.

Thus, cushion structure 28 can be properly positioned on the main frame 19 by utilizing indexing tabs which extend from the cushion and are receivable in suitable apertures formed in the main frame. Alternatively, the cushion structure can be properly positioned on the main frame by providing the cushion with a suitable contour, such as recess 31, for permitting the cushion to be seated on the main frame in a nested relationship therewith. Either or both of these indexing devices may be provided for positioning the cushion structure on the main frame.

After the cushion structure 28 has been properly positioned on the main frame 19, the upholstery cover 33 is positioned around the cushion structure 28 and the exposed edges of the main frame 19. The edge portions 36 of the cover 33 are then secured to the main frame to connect the cushion structure to the main frame and hold same in the desired position.

BASE MODIFICATIONS

FIGS. 8 and 9 illustrate therein a modified base portion 111 for a vehicle seat, which base portion has a conventional exterior appearance. The base portion 111 includes a substantially conventional rectangular main frame 119 which includes spaced parallel side rails 122 and 123 interconnected by front and rear rails 121 and 124, respectively. A cushion structure 128, constructed according to the present invention, is adapted to be positioned on the main frame 119. The cushion structure 128 includes an internal support assembly 139 which is embedded within a layer of resilient material 129. The internal support assembly 139 is provided with a pair of side support members 141 which have downwardly extending tabs 143 on the forward ends thereof adapted to extend into apertures 178 (FIG. 9) formed in the front rail 121. The rearward ends of the support members 141 are provided with an integral cross member 148 therebetween, which cross member is positioned directly over and spaced above the rear rail 124. The support members 141 have flexible load transfer members 151 mounted thereon which are identical to the load transfer member 51 described above. Further, a conventional upholstery tie wire 158 extends between the side support members 141.

As illustrated in FIG. 8, the side support members 141 are spaced inwardly from the side rails 122 and 123, rather than being positioned directly thereover as in the embodiment illustrated in FIG. 4. However, as in the previously described embodiment, the complete internal support assembly 139, except for the tabs 143, is embedded within the resilient material 129. Thus, when the cushion structure 128 is positioned on the main frame 119, tabs 143 extend into apertures 178 and functions as indexing means for assisting in properly positioning the cushion structure 128 on the main frame 119.

Further, when the cushion structure 128 is initially molded, it is provided with a recessed corner 131 (FIG. 9) which defines on the cushion a downwardly projecting center portion 132. Thus, when the cushion structure 128 is positioned on the main frame 119, the projecting center portion 132 extends into the opening defined by the rails of the main frame 119 such that the cushion 128 is thus positioned in nesting relationship with the main frame. When so positioned, the upper surface 134 of the recess 131 contacts the upper surface of the frame and acts as a load support surface. An upholstery cover 133 is then positioned around the cushion structure 128 with the edge portions 136 thereof being secured to the frame 119 in a conventional manner to hold and properly maintain the cushion structure 128 positioned on the frame.

FIGS. 10 and 11 illustrate a further modification of a base portion 211 for a vehicle seat constructed according to the present invention. Specifically, the base portion 211 has a cushion structure 228 mounted on a conventional tubular main frame 219 of substantially rectangular configuration. The main frame 219 has front and rear rails 221 and 224, respectively, connected by substantially parallel side rails 222. The rear rail 224 is further provided with a pair of mounting flanges 225 which cooperate with the hinge structure used for mounting the back portion of the seat.

The cushion structure 228 again comprises a layer of resilient material 229 having embedded therein an internal support assembly 239, which assembly includes a pair of spaced side support members 241 having flexible load transfer members 251 mounted thereon, the members 251 being identical to the members 51 described above. The rearward ends of the support members 241 are provided with rearwardly extending tabs 279 which project outwardly from a portion of the resilient material 229 and are adapted to extend into suitable apertures 280 (FIG. 11) provided in the mounting flanges 225. As illustrated in FIG. 11, tabs 279 extend into a recess 231 formed in the cushion structure. A conventional upholstery tie wire 258 is connected between the side support members 241. The front ends of the side support members 241 are connected by clips 281 to the base portion 282 of a substantially U-shaped frame element 283. The base portion 282 of the frame element 283 is spaced from and positioned above the front rail 221 and is provided at the opposite ends thereof with a pair of rearwardly extending leg portions 284 which are positioned outwardly of the support members 241 substantially directly above the side rails 222. The leg portions 284 are further provided with downwardly extending tabs 285 on the free ends thereof which are adapted to be received in suitable apertures 286 (FIG. 11) formed within the side rails 222.

As in the previously described embodiments, the internal support assembly 239, except for the tabs 279 and 285, is completely embedded within the resilient material 229 with the tabs 279 and 285 being utilized as indexing means for permitting the cushion structure 228 to be properly positioned on the main frame 219 during assembly of the base portion 211. Further, as illustrated in FIG. 10, the cushion 228 is provided with a recess 231 in the bottom surface thereof which extends around the cushion adjacent the sides thereof to form a substantially rectangularly shaped loop adapted, as in the FIGS. 1-7 embodiment, to receive therein the main frame 219 to permit the cushion structure 228 to be positioned on the main frame 219 in nested relationship therewith. The cushion structure 228, after being positioned on the main frame 219, is connected thereto by means of an upholstery cover 233 which surrounds the cushion structure and is connected to the main frame adjacent the edge portions 236 thereof.

A still further embodiment of a base portion is illustrated in FIG. 12 wherein a base portion 311 is provided with a cushion structure 328 positioned on a conventional main frame 319. The main frame 319 is of tubular construction and is provided with a pair of spaced parallel side rails 322 (only one side rail shown) interconnected by a front rail 321. The cushion 328 comprises a layer of resilient material 329 in which is embedded an internal support assembly 339 which includes a pair of spaced side support members 341 integrally connected adjacent the rearward ends thereof by cross member 348. Each of the support members 341 has a flexible load transfer member 351 mounted thereon, which member 351 is also identical to the member 51 described above. The forward ends of the support members 341 are connected by clips 381 to the base portion 382 of a U-shaped frame element 383, which frame element has rearward extending leg portions 384 positioned over the side rails 322. Downwardly extending tabs 385 are formed on the free ends of the leg portions 384, which tabs 385 are adapted to be received within suitable apertures 386 formed within the side rails 322. The structure is thus substantially similar to the internal support assembly 239 illustrated in FIGS. 10 and 11.

Internal support assembly 339 (FIG. 12) is further provided with a U-shaped rear frame element 387 having a central base portion 388 which is spaced rearwardly of the cross member 348 and is interconnected thereto by means of flexible tie members 389. The frame element 387 further has a pair of forwardly extending leg portions 390 which have downwardly extending tabs 391 formed on the free ends thereof, which tabs are also adapted to extend downwardly through the aperture 386.

The cushion structure 328 illustrated in FIG. 12 thus has the internal support assembly 339, except for the tabs 385 and 391, completely embedded within the resilient material 329. The cushion structure 328 is located on the main frame 319 solely by means of the tabs 385 and 391 extending through the pair of apertures 386. As illustrated in FIG. 12, the bottom surface 392 of the cushion 328 is substantially flat and bears against the upper surface of the frame 319. Thus, the cushion does not fit on the frame in nested relationship as in the embodiments disclosed in FIGS. 1-11, but rather is located on the frame solely by means of the tabs 385 and 391.

The frame 319 illustrated in FIG. 12 is further provided with an additional U-shaped rail member 393 which is positioned directly under and connected to the rail members 321 and 322. The cushion structure 328 is held in position on the upper rail members 321 and 322 by means of an upholstery cover 333 which surrounds same and extends downwardly to the lower rail member 393, the edge portion 336 of the cover being secured to the lower rail member 393.

BACK MODIFICATIONS

Figure 13:
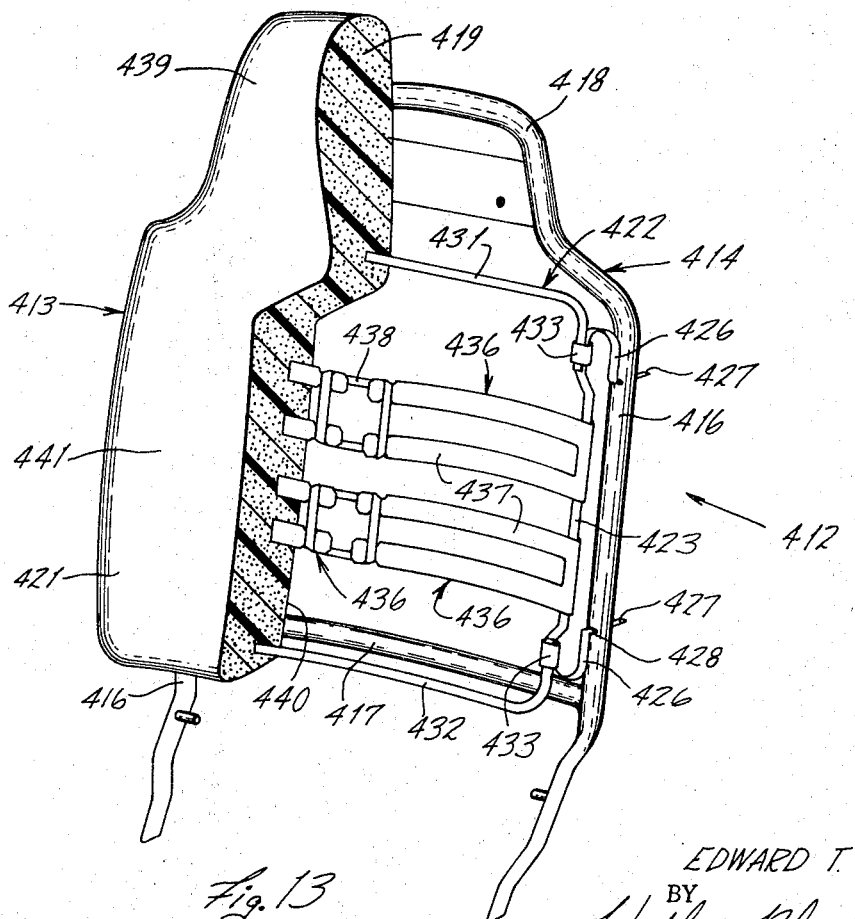
FIG. 13 is a broken perspective view of a back portion for a vehicle seat embodying therein a cushion structure constructed in accordance with the present invention.

FIG. 13 illustrates a back portion 412 of a vehicle seat having a cushion structure 413 on the front side thereof constructed in accordance with the present invention. Specifically, the back portion 412 has a main frame 414 which includes a pair of spaced side rails 416 which are adapted to be pivotally connected to a base portion of a vehicle seat, such as the base portion 311 illustrated in FIG. 12. The side rails 416 are connected by a bottom rail 417 and are also connected adjacent the upper ends thereof by a top rail 418 which is shaped to accommodate a head rest.

The cushion structure 413 comprises a layer of resilient material 419 having an internal support assembly 422 embedded therein. The internal support assembly 422 includes a pair of substantially parallel side support members 423, only one of which is shown since the support assembly 422 is longitudinally symmetrical. The opposite ends of support members 423 are bent to form substantially U-shaped opposed hook portions 426, which hook portions each have a tab or finger 427 formed on the free end thereof. The tabs 427 are adapted to extend into apertures 428 formed in the side rails 416. Top and bottom cross members 431 and 432 extend between and are connected to the opposite ends of the side support members 423 by means of clips 433.

The internal support assembly 422 further includes flexible load transfer members 436 mounted on each of the side support members 423, the flexible load transfer members 436 each having a plurality of cantilevered resilient fingers 437 which extend into the central part of the back portion 412. The adjacent ends of the fingers are connected by rubber bands 438. The flexible load transfer members 436 are substantially similar to the flexible load transfer members 51 illustrated in FIG. 3. However, FIG. 13 discloses the use of two separate flexible load transfer members 436 mounted on each side support member 423, with each of the members 436 having only two fingers thereon. However, the two members 436 positioned on each support member 423 could be integrally formed as a single member if desired.

As illustrated in FIG. 13, the complete internal support assembly 422, except for the tabs 427, is embedded within the layer of resilient material 419 to form the cushion structure 413. The cushion structure 413 is then positioned on the frame 414 by inserting the tabs 427 into the apertures 428. It should be noted that the rear surface 440 of the cushion structure 413 is substantially flat and thus bears against the rails of the main frame 414 when the tabs 427 are inserted into the apertures 428. The cushion structure 413 is further provided with a head rest portion 439 which can be formed separately or, as illustrated in FIG. 13, can be formed integrally with the rectangular portion 421.

After the cushion 413 has been positioned on the frame 414, a further thin layer of foam is positioned adjacent the rear side of the frame 414 and the cushion structure 413 is then surrounded by a suitable cover of upholstery material 441 to hold the cushion structure in assembled relationship with the frame.

Figure 14:
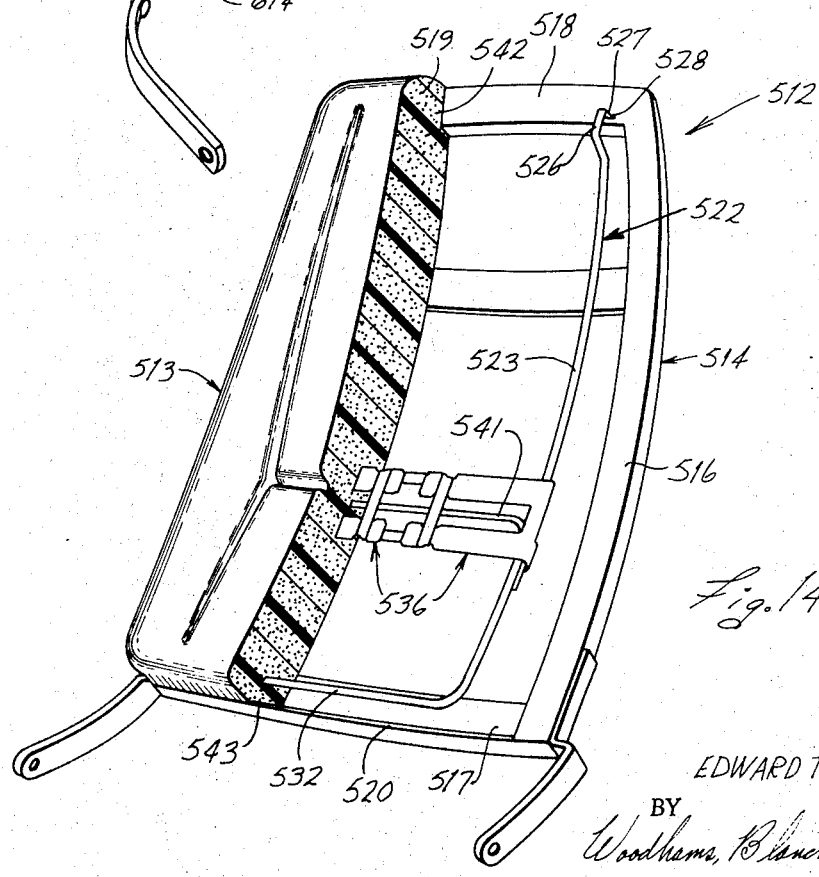
FIG. 14 is a broken perspective view of a further back portion for a vehicle seat.

FIG. 14 illustrates a further back modification 512 wherein a cushion structure 513 is mounted on a main frame 514 which has spaced side rails 516 (only one shown) connected by bottom and top rails 517 and 518, respectively. The cushion structure 513 again comprises a layer of resilient material 519 having an internal support assembly 522 embedded therein. Internal support assembly 522 is longitudinally symmetrical and includes a pair of spaced side rails 523 (only one shown) integrally connected adjacent their lower ends by a cross member 532.

The upper ends of the support members 523 are formed with hook portions 526, the free end of which constitutes a tab 527 which is receivable within apertures 528 formed in the top rail 518. Flexible load support members 536 (substantially identical to members 436 described above) are mounted on the side support members 523 and an upholstery tie down wire 541 extends between and is interconnected to the side support members 523.

The complete internal support assembly 522, except for the tabs 527, is embedded in the layer of resilient material 519 such that only the tabs 527 extend beyond the external periphery of the resilient material 519 forming the cushion structure. The extending tabs 527 are thus utilized to index or position the cushion 513 on the frame 514 by inserting the tabs 527 into the apertures 528. The rear surface of the cushion 513 is further provided with a first U-shaped recess 542 which extends along the sides and upper edge thereof for permitting the side rails 516 and top rail 518 to be received thereinto when the cushion structure 513 is mounted on the frame 514. The cushion structure 513 is additionally provided with a small recess 543 along the bottom edge thereof in which is received a flange 520 secured to the bottom rail 517. The recesses 542 and 543 thus additionally assist in positioning the cushion 513 permitting the cushion to be seated on the frame in nested relationship therewith.

It should be further noted that the cushion structure illustrated in FIG. 14 has the bottom cross member 532 positioned directly over the bottom rail 517, being spaced therefrom by a layer of resilient material. However, the side support members 523 are spaced inwardly from the side rails 516 and thus are also usable as upholstery tie down wires. On the other hand, the back portion 412 illustrated in FIG. 13 has the side support members 423 positioned directly above the side rails 416, being spaced and separated therefrom by a layer of resilient material.

Figure 15:
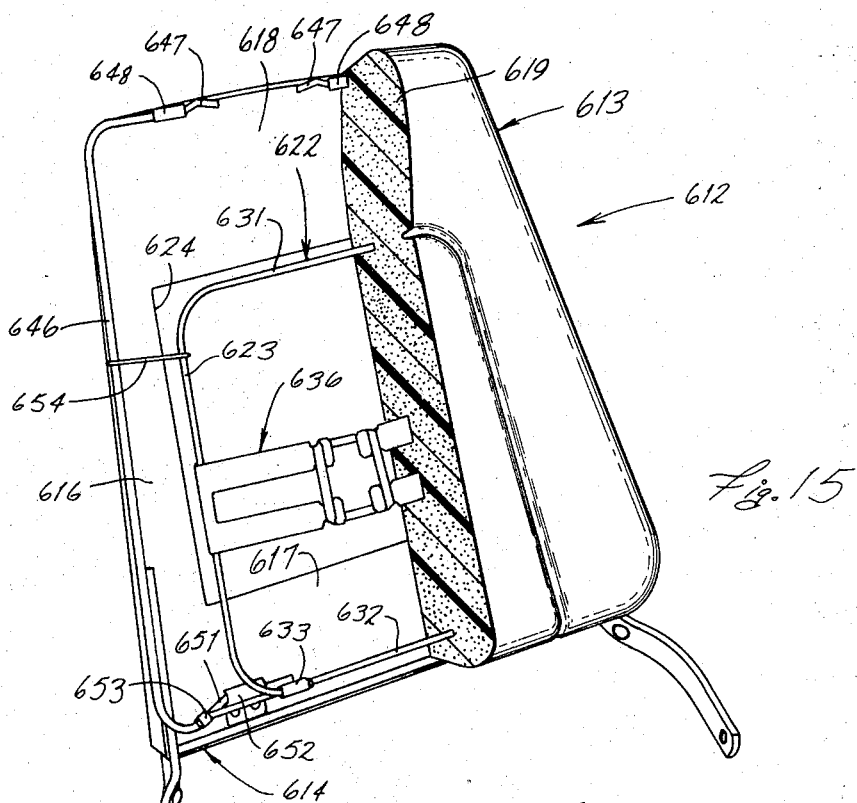
FIG. 15 is a broken perspective view of still a further back portion for a vehicle seat.

A still further modification of a back assembly constructed according to the present invention is illustrated in FIG. 15. The back assembly 612 illustrated therein includes a cushion 613 adapted to be mounted on a main frame 614. The main frame 614 is of a rectangular pan-like configuration and has spaced side members 616 (only one shown) connected by bottom and top members 617 and 618, respectively, defining a central rectangular opening 624 therein.

The cushion 613 again comprises a layer of resilient material 619 having an internal support assembly 622 embedded therein. The internal support assembly is longitudinally symmetrical and comprises a pair of spaced side support members 623 (only one shown) having an integrally formed top cross member 631 extending therebetween. The lower ends of the side support members 623 are connected to a bottom cross member 632 by means of clips 633. Each of the side support members 623 has a flexible load transfer member 636 supported thereon, the member 636 being substantially identical to the member 436 described above. The side support member 623 and the top cross member 631 are spaced inwardly from the extreme edges of the frame 614 and substantially define the central region of the seat back, which region is subjected to the heaviest load.

The internal support assembly 622 further includes a pair of spaced frame elements 646 (only one shown) which are positioned adjacent the opposite edges of the frame 614 in outwardly spaced relationship with respect to the side support members 623. The free upper ends of the frame elements 646 are provided with locating fingers 647 thereon which are adapted to be positioned underneath tabs or clips 648 which are formed on the top frame member 618. The lower ends of the frame elements 646 are provided with similar fingers 651 thereon which are adapted to be positioned under similar tabs or mounting clips 652 which are fixedly secured to the bottom frame member 617. As illustrated in FIG. 15, the ends of the bottom cross member 632 extend beyond the clips 633 and are interconnected to the frame elements 646 by means of clips 653. Intermediate tie members 654 are also provided for additionally connecting the frame elements 646 to the side support members 623 adjacent the upper ends thereof.

The internal support assembly 622, except for the fingers 647 and 651, is completely embedded within the layer of resilient material 619 to form the cushion structure 613. The cushion 613 is positioned on the frame 614 by means of the fingers 647 and 651 being positioned under the tabs or clips 648 and 652, respectively. The fingers can be positioned under the clips by flexing the cushion so as to permit the fingers to be snapped into position under the clips. Alternately, the clips 648 can be deformable so as to be easily bent into position in surrounding relationship with the fingers 647 after the cushion structure 613 has been positioned on the pan-like frame 614. A cover of suitable upholstery material is then utilized to surround the cushion structure and the frame to form the completed back portion 612.

It will be apparent the the back and base portions for vehicle seats as described above incorporate therein a novel cushion structure which is usable wtih conventional seat frames for permitting the manufacture and assembly of a wide variety of comfortable vehicle seats in an easy and efficient manner. Specifically, the internal support assembly utilized within the cushion structure of the present invention can be easily formed from wire or similar bar-like material. Further, all of the elements of the internal support assembly are interconnected such that the assembly thus effectively constitutes a single unit, thereby permitting ease of handling. Further, since the unit has integral tabs thereon which extend through the resilient layer of the cushion, these tabs can be utilized to perform the double function of supporting the assembly within the mold during formation of the cushion and additionally permitting the completed cushion structure to be easily and accurately positioned on a conventional independent seat frame.

The embodiments of the invention in which an exclusive property or privilege is claimed are defined as follows:

1. A cushion structure adapted to be mounted on an independent main frame means, said cushion structure comprising:
   internal support means adapted to be carried on said main frame means, said support means including spaced support members;
   said support means further including load transfer means attached to at least one of said support members, said load transfer means extending toward the center portion of said cushion structure;
   elastomeric material surrounding and embedding at least a portion of said support means and said load transfer means; and
   means fixedly secured to said cushion structure for locating said cushion as a unitary structure on said independent main frame means.

2. A cushion structure according to claim 1, in which the means for locating the cushion structure on the main frame means includes finger means fixedly related to the support means and extending outwardly through the external periphery of the elastomeric material, the finger means cooperating with aperture means formed in the main frame means for permitting the cushion structure to be properly positioned thereon.

3. A cushion structure according to claim 2, in which said load transfer means includes first and second flexible load transfer members respectively supported solely at one end to one of said support members and extending transversely toward each other and terminating in spaced relation to one another.

4. A cushion structure according to claim 1, in which the locating means includes means formed by the elastomeric material of said cushion structure for permitting said cushion structure to be positioned on said main frame means in nested relationship therewith.

5. A cushion structure according to claim 4, in which the elastomeric material of the cushion structure has a recess formed therein with the main frame means being at least partly positionable within the recess for permitting the cushion structure to be mounted on the main frame means in nested relationship therewith.

6. A cushion structure according to claim 5, further including holding means for securing said cushion structure to said main frame means, said holding means including a cover of upholstery material at least partially surrounding the cushion structure and the main frame means.

7. A cushion structure according to claim 1, in which said support means includes a pair of said support member in spaced substantially parallel relationship and a cross member extending between and fixedly interconnected to said pair of support members adjacent one end thereof, said load transfer means including a flexible load transfer member attached to each of said pair of support members, said load transfer members being respectively supported solely at one end by said support members with the other end of said load transfer members extending toward and terminating in spaced relation to one another, and said locating means including finger means fixedly interconnected to said support means and extending outwardly through said elastomeric material for cooperation with said main frame means for permitting said cushion structure to be properly positioned thereon.

8. A cushion structure according to claim 7, in which said finger means includes a finger fixedly connected to each of said support members adjacent the other end thereof, said fingers extending outwardly beyond the external periphery of said cushion structure as defined by the external surface of said elastomeric material.

9. A cushion structure according to claim 7, in which said support means further includes a pair of elongated frame elements embedded within said elastomeric material and positioned outwardly and on opposite sides of said pair of support members, and connecting means operatively connecting each of the support members to an adjacent frame element, said finger means including a finger fixedly secured to each of said frame elements and extending outwardly through the elastomeric material.

10. A cushion structure according to claim 7, in which the main frame means includes spaced side rails, and in which the support elements are positioned substantially directly adjacent said side rails and are separated therefrom by a layer of elastomeric material, whereby external loads applied to the cushion structure will be partially transferred from said support members directly to said side rails.

11. A cushion structure according to claim 7, in which the main frame means includes a pair of spaced side rails, and in which the support elements are spaced inwardly between said side rails.

12. A cushion structure according to claim 7, in which an upholstery tie wire is interconnected between the support members and is surrounded and embedded within said elastomeric material.

13. A cushion structure according to claim 7, in which the flexible load transfer members each include a plurality of finger-like elements extending outwardly into the central portion of the cushion structure, said elastomeric material being bonded to at least a portion of the finger-like elements.

14. A cushion structure according to claim 7, in which the elastomeric material of the cushion structure is contoured to fit on the main frame means in nested relationship therewith.

15. A seat structure, particularly for a vehicle, comprising:
   a main frame means adapted to be connected to the vehicle;

a cushion structure positioned on said main frame means and having an external load engaging surface and further having an external bearing surface in abutting engagement with said main frame means for transferring the external load thereof, said cushion structure being independent of and separable from said main frame means;

said cushion structure including an internal support means surrounded by and embedded in a layer of elastomeric material, said support means including at least a pair of spaced support members and load transfer means attached to said support members and extending into the central portion of said cushion structure; and said cushion structure further including locating means cooperating with said main frame means for properly positioning said cushion structure on said frame means.

16. A seat structure according to claim 15, further including an upholstery cover at least partially surrounding said cushion structure and said main frame means for securely connecting said cushion structure to said main frame means.

17. A seat structure according to claim 15, in which said locating means includes abutment means formed on said layer of elastomeric material coacting with said main frame means for creating a nested relationship there-between, whereby said cushion structure can be moved toward or away from said main frame means but is prevented from moving laterally in at least one direction relative thereto when said cushion structure is positioned on said main frame means.

18. A seat structure according to claim 15, in which said locating means includes at least one pair of locating fingers interconnected to said support means and extending outwardly beyond the external periphery of said layer of elastomeric material, said main frame means further having aperture means formed therein with said locating fingers being inserted into said aperture means for properly positioning said cushion structure on said main frame means.

19. A seat structure according to claim 18, in which said load transfer means includes a load transfer member attached to each of said support members, the load transfer members each having a base portion attached to its respective support member and a plurality of finger-like elements fixedly interconnected to the base portion and extending outwardly therefrom into the central portion of the cushion structure, the finger-like elements of the load transfer members being positioned in opposition to one another with the free ends of the finger-like elements of one load transfer member being positioned in nonoverlapping relationship with the free ends of the finger-like elements of the other load transfer member.

20. A seat structure according to claim 18, in which said support means includes a cross member extending between and fixedly connected to said support members adjacent one end thereof, the other ends of said support members having said locating fingers rigidly secured thereto.

21. A seat structure according to claim 18, in which the support means further includes a pair of elongated frame elements embedded within said elastomeric material and positioned outwardly, and on opposite sides, of said pair of support members, and connecting means operatively connecting each of said support members to an adjacent frame element, each of said frame elements having a locating finger fixedly secured thereto and extending outwardly through the elastomeric material.

References Cited

UNITED STATES PATENTS

| | | | |
|---|---|---|---|
| 3,329,466 | 7/1967 | Getz et al. | 297—452 X |
| 3,353,869 | 11/1967 | Getz et al. | 297—452 |
| 3,363,943 | 1/1968 | Getz et al. | 297—452 |
| 3,389,935 | 6/1968 | Getz et al. | 297—452 |

CASMIR A. NUNBERG, Primary Examiner

U.S. Cl. X.R.

297—458